US011327229B2

(12) United States Patent
Ott

(10) Patent No.: US 11,327,229 B2
(45) Date of Patent: May 10, 2022

(54) ELASTOMERIC OPTICAL FIBER ALIGNMENT AND COUPLING DEVICE

(71) Applicant: COMMSCOPE, INC. OF NORTH CAROLINA, Hickory, NC (US)

(72) Inventor: Michael James Ott, Hudson, WI (US)

(73) Assignee: COMMSCOPE, INC. OF NORTH CAROLINA, Hickory, NC (US)

(*) Notice: Subject to any disclaimer, the term of this patent is extended or adjusted under 35 U.S.C. 154(b) by 76 days.

(21) Appl. No.: 17/006,119

(22) Filed: Aug. 28, 2020

(65) Prior Publication Data
US 2021/0018685 A1 Jan. 21, 2021

Related U.S. Application Data

(63) Continuation of application No. 16/312,139, filed as application No. PCT/US2017/039017 on Jun. 23, 2017, now Pat. No. 10,761,270.
(Continued)

(51) Int. Cl.
G02B 6/255 (2006.01)
G02B 6/036 (2006.01)
(Continued)

(52) U.S. Cl.
CPC ........ *G02B 6/2551* (2013.01); *G02B 6/03611* (2013.01); *G02B 6/2557* (2013.01);
(Continued)

(58) Field of Classification Search
CPC ............. G02B 6/2551; G02B 6/03611; G02B 6/2557; G02B 6/3806; G02B 6/3822; G02B 6/3881; G02B 6/40
See application file for complete search history.

(56) References Cited

U.S. PATENT DOCUMENTS 3,455,625 A   7/1969   Brumley et al.
4,080,044 A   3/1978   Gousseau
(Continued)

FOREIGN PATENT DOCUMENTS

JP   3157863 B2   4/2001
JP   5228037 B2   7/2013
(Continued)

OTHER PUBLICATIONS

International Search Report and Written Opinion of the International Searching Authority for International Patent Application No. PCT/US2017/039017 dated Sep. 27, 2017, 13 pages.

Primary Examiner — Ryan A Lepisto
Assistant Examiner — Erin D Chiem
(74) Attorney, Agent, or Firm — Merchant & Gould P.C.

(57) ABSTRACT

A fiber optic coupling device comprises an elastomeric body. The elastomeric body includes first and second sides with a deformable alignment passage extending there between. The deformable alignment passage is configured to elastically center opposing first and second optical fibers. The deformable alignment passage includes a first portion that is configured to receive the first optical fiber having a first core. The deformable alignment passage also includes an opposing second portion that is configured to receive the second optical fiber having a second core. The first portion and the opposing second portion of the alignment passage are defined by a common encompassing periphery, and meet at a common location within the alignment passage to present the core of the received first optical fiber in coaxial alignment with the core of the received second optical fiber.

20 Claims, 7 Drawing Sheets

Related U.S. Application Data

(60) Provisional application No. 62/354,480, filed on Jun. 24, 2016.

(51) Int. Cl.
    *G02B 6/38*     (2006.01)
    *G02B 6/40*     (2006.01)

(52) U.S. Cl.
    CPC ......... *G02B 6/3806* (2013.01); *G02B 6/3822* (2013.01); *G02B 6/3881* (2013.01); *G02B 6/40* (2013.01)

(56) References Cited

U.S. PATENT DOCUMENTS

| | | | |
|---|---|---|---|
| 4,325,607 A | 4/1982 | Carlsen | |
| 4,647,150 A * | 3/1987 | DeSanti | G02B 6/3801 385/98 |
| 4,928,004 A | 5/1990 | Zimmermann et al. | |
| 5,319,733 A | 6/1994 | Emmons et al. | |
| 5,530,786 A | 6/1996 | Radliff et al. | |
| 6,266,472 B1 * | 7/2001 | Norwood | G02B 6/3806 385/137 |
| 6,351,593 B1 | 2/2002 | Pollack et al. | |
| 8,985,864 B2 | 3/2015 | Ott | |
| 8,985,867 B2 | 3/2015 | Ott | |
| 9,575,272 B2 | 2/2017 | Ott | |
| 2004/0190851 A1 * | 9/2004 | Garner | G02B 6/3672 385/137 |
| 2010/0183274 A1 * | 7/2010 | Brunet | G02B 6/4455 385/135 |
| 2012/0301073 A1 | 11/2012 | DeMeritt et al. | |
| 2013/0251317 A1 * | 9/2013 | Faulkner | G02B 6/2553 385/96 |
| 2015/0131950 A1 * | 5/2015 | Ducra | G02B 6/4427 385/96 |
| 2017/0219792 A1 * | 8/2017 | Debban | G02B 6/448 |
| 2019/0293886 A1 * | 9/2019 | Chiasson | G02B 6/443 |

FOREIGN PATENT DOCUMENTS

| | | |
|---|---|---|
| WO | 2012/112344 A1 | 8/2012 |
| WO | 2013/117589 A2 | 8/2013 |
| WO | 2013/117598 A2 | 8/2013 |
| WO | 2016/043922 A1 | 3/2016 |
| WO | 2016/100384 A1 | 6/2016 |

* cited by examiner

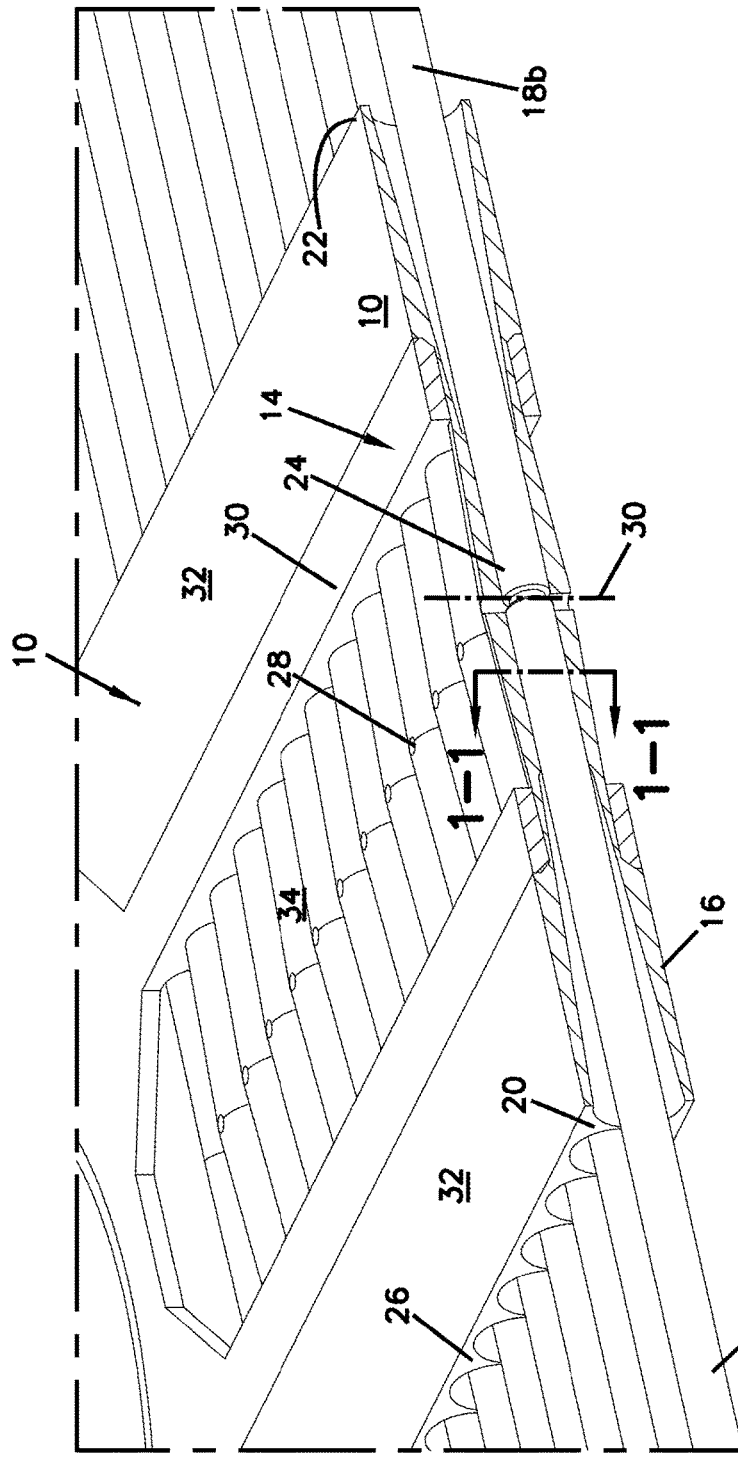
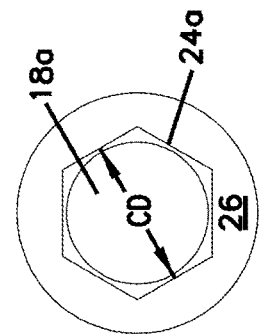
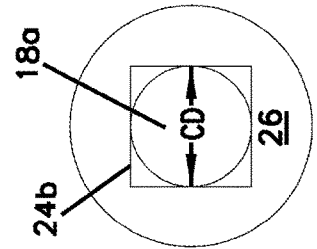
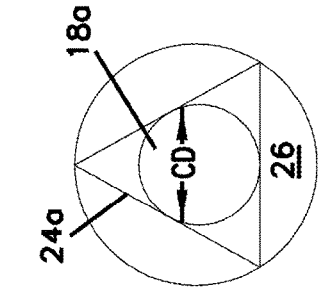
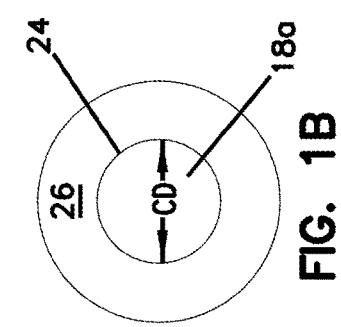

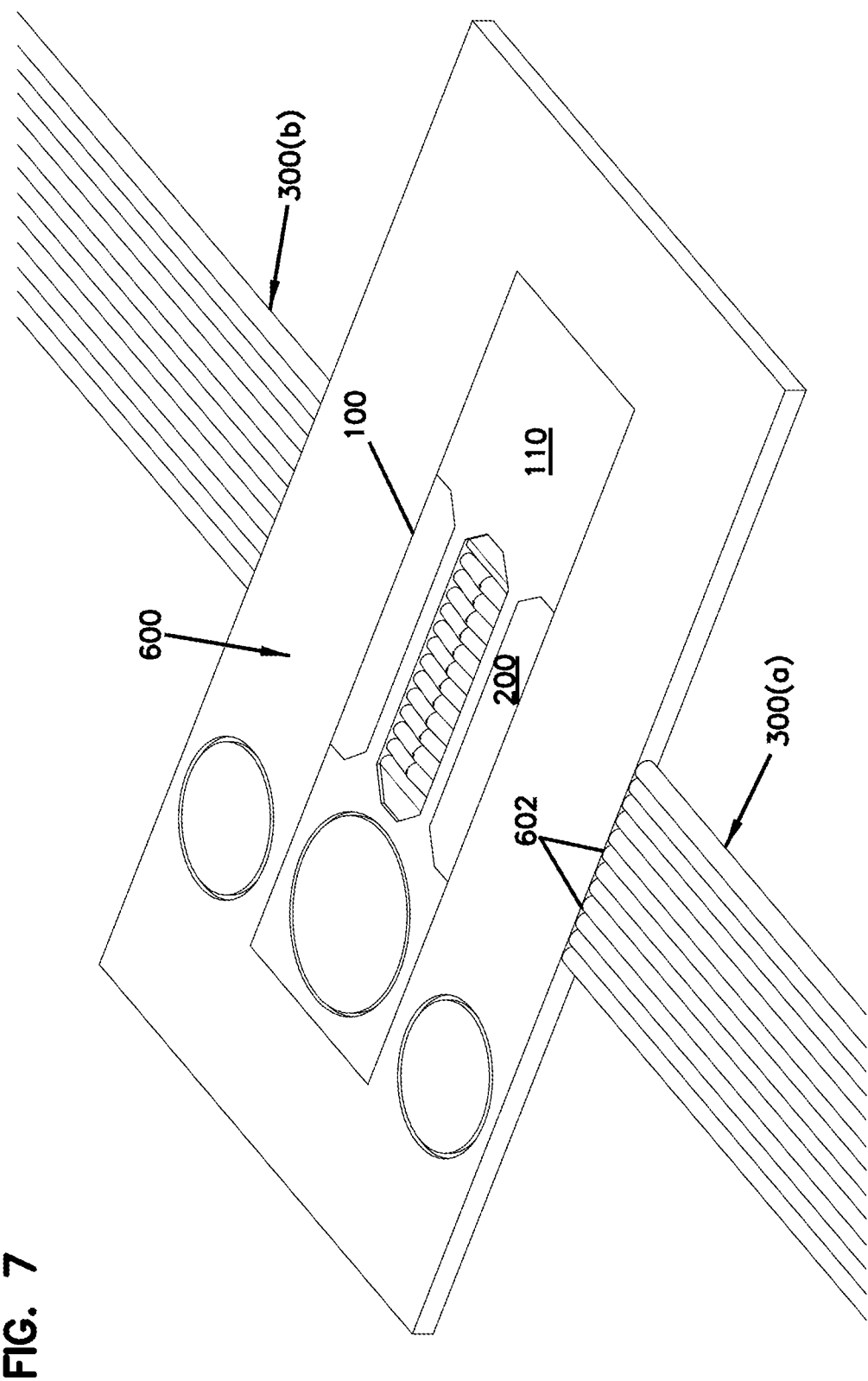

ELASTOMERIC OPTICAL FIBER ALIGNMENT AND COUPLING DEVICE

CROSS-REFERENCE TO RELATED APPLICATIONS

This application is a Continuation of U.S. patent application Ser. No. 16/312,139, filed on Dec. 20, 2018, now U.S. Pat. No. 10,761,270, which is a National Stage Application of PCT/US2017/039017, filed on Jun. 23, 2017, which claims the benefit of U.S. Patent Application Ser. No. 62/354,480, filed on Jun. 24, 2016, the disclosures of which are incorporated herein by reference in their entireties. To the extent appropriate, a claim of priority is made to each of the above disclosed applications.

TECHNICAL FIELD

The present disclosure is directed to the coupling of optical fibers and, more particularly, to the coaxial alignment of optical fibers with an elastomeric coupling device.

BACKGROUND

Communication systems utilizing fiber optic cables are in wide spread use. Each fiber optic cable includes one or more optical fibers, each of which comprises a waveguide configured to transmit optical signals containing various types of information and/or power. The optical signals comprise light that enters one end of the fiber and exits the opposite end of the fiber. Transmission of an optical signal over a single length of fiber subjects the optical signal to minimal loss. However, to transmit optical signals over long distances, periodic coupling of fibers is necessary. Each instance of coupling can introduce loss into the optical signal through various factors including misalignment of the cores of the fibers. Accordingly, fiber alignment and the minimization of loss in the coupling of fibers is a concern.

Various methods and devices have been developed to assist with alignment and minimization of loss. For example, fusion splicing, e.g., fusing the ends of two fibers together with a heat treatment, can be used for couplings that are intended to be permanent and stable. Fusion splicing is performed using an automated precision alignment tool and produces a fiber coupling with extremely low loss. For couplings that are non-permanent, a ferrule is provided about the interfacing ends of the optical fibers to which is secured interfacing connectors, e.g., SC, LC and ST connectors. Care is taken to correctly position the cores of the optical fibers such that when interfacing connectors are coupled the fibers held within the ferrules of the interfacing connectors are coaxially aligned such that loss is kept to a minimum. In high density fiber applications coupling devices comprising v-groove array assemblies, wherein the v-grooves help to position fibers for alignment, are used. Fusion splicing of optical fibers, equipping optical fibers with ferrule connectors, and the use of v-groove array assemblies can introduce significant time and financial costs to fiber optic systems as well as undesired signal transmission losses.

SUMMARY

One aspect of the present disclosure is directed to a fiber optic coupling device comprising an elastomeric body. The elastomeric body includes first and second sides with a deformable alignment passage extending there between. The deformable alignment passage includes a first portion that is configured to receive a first optical fiber having a first core. The deformable alignment passage also includes an opposing second portion that is configured to receive a second optical fiber having a second core. The first portion and the opposing second portion of the alignment passage are defined by a common encompassing periphery, and meet at a common location within the alignment passage to present the core of the received first optical fiber in coaxial alignment with the second core of the received second optical fiber.

Another aspect of the present disclosure is directed to a fiber optic coupling device comprising a frame and an elastomeric body contained by the frame. The elastomeric body includes first and second sides with a deformable alignment passage extending there between. The deformable alignment passage is configured to elastically center opposing first and second optical fibers. The deformable alignment passage includes a first portion that is configured to receive a first optical fiber having a first tip portion and a first core. The deformable alignment passage also includes an opposing second portion that is configured to receive a second optical fiber having a second tip portion and a second core. The first portion and the opposing second portion are configured to have a common periphery that provides 360 degree support about the first and second tip portions of the received first and second optical fibers, respectively. The first portion and the opposing second portion of the alignment passage meet at a common location within the alignment passage to present the core of the received first optical fiber in coaxial alignment with the core of the received second optical fiber.

Still another aspect of the present disclosure is directed to a method for aligning cores of first and second optical fibers. The method comprises receiving the first optical fiber into a first opening of a deformable alignment passage of an elastomeric body through a common periphery to a common location and receiving the second optical fiber into a second opening of the deformable alignment passage of the elastomeric body through the common periphery to the common location. The method further comprises elastically aligning the received first and second optical fibers within an alignment passage of the elastomeric body to achieve coaxial alignment of the cores at the common location.

BRIEF DESCRIPTION OF THE DRAWINGS

FIG. 1A is a cross-sectional view of an alignment passage of a coupling device according to the present disclosure.

FIGS. 1B-1E are cross-sectional views of peripheries of the alignment passage.

FIG. 7 is a perspective view of the coupling device in combination with a fiber optic guide.

DETAILED DESCRIPTION

Figure 2:
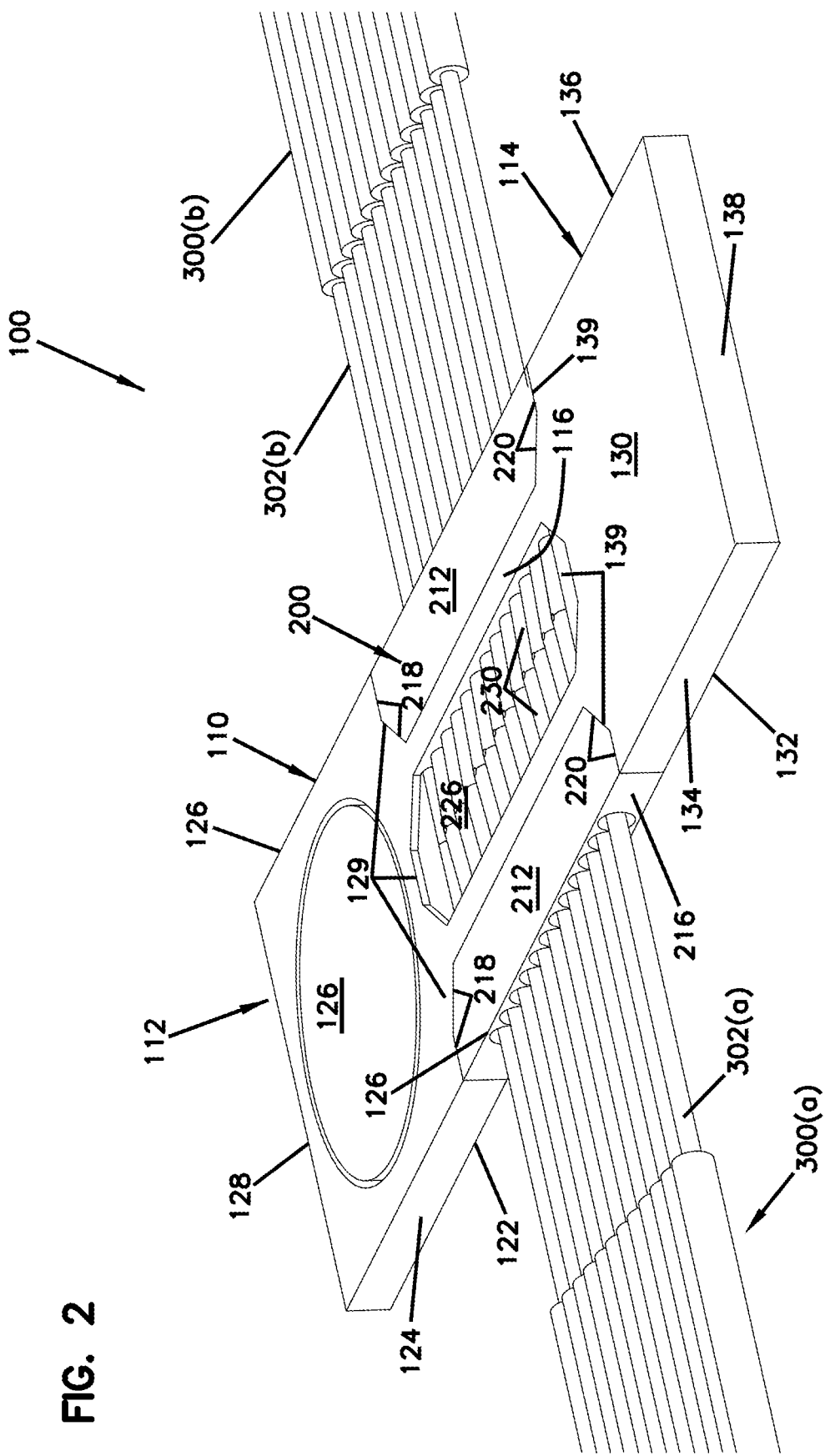
FIG. 2 is a perspective view of a coupling device according to the present disclosure.

The present disclosure is directed to devices and methods for coupling and coaxially aligning optical fibers. The coupling device generally includes a body that is fabricated from an elastomer material; the body is configured to include a plurality of alignment passages. The alignment passages are defined by a periphery having a least one cross-dimension that is smaller than the diameter of the fiber which is inserted therein. The alignment passages function to couple the ends of optical fibers and, in doing so, operate to align the outer diameters of the fibers such that the true centers of the optical fibers are aligned enabling transmission of optical signals over the coupled and coaxially aligned fibers. The coupling device is configured to elastically deform, rather than plastically deform, such that the coupling device can recover its shape and provide desired performance over many uses.

Referring to FIG. 1A a cross-sectional view of an example embodiment of an elastomeric coupling device 10 of the present disclosure is illustrated. The elastomeric coupling device 10 functions as an alignment interface for aligning ferrule-less or ferruled optical fibers 18a, 18b. The coupling device 10 generally comprises an elastomeric body 12 about which may be placed an optional frame 14. The elastomeric body 12 includes one or more passages 16 configured to receive a first optical fiber 18a at a first end 20 and configured to receive a second optical fiber 18b at a second end 22. Each of the passages 16 is defined by a periphery 24, see FIG. 1B, that is configured to completely encompass the outer diameter (OD) of the fibers 18a, 18b. In the instance of a circular periphery 24, a diametrical cross-dimension (CD) of at least a portion of the passage 16 is smaller than the OD of the fiber 18a, 18b. Accordingly, upon insertion of the fibers 18a and 18b, the periphery 24 of the passage 16 elastically deforms to fully surround and axially orient each of the fibers 18a, 18b. Note that prior to insertion of the fibers 18a, 18b the ends of the fibers 18a, 18b are preferably heat treated. Additional information about the heat treating of optical fibers is described in WO2012/112344 entitled "Portable Device for Attaching a Connector to an Optical Fiber", the entire disclosure of which is hereby incorporated by reference.

FIGS. 1C-1E illustrate alternative periphery configurations of the passage 16 with a triangular periphery 24a, a square periphery 24b, and a hexagonal periphery 24c, respectively. Other periphery configurations are also possible. Regardless of the periphery configuration, at least one cross-dimension (CD) of the periphery 24 is less than the OD of the fiber 18a, 18b causing the passage 16 to elastically deform upon insertion of the fiber 18a, 18b such that encompassing contact/support is provided by the passage 16. The walls 26 between passages 16 are of sufficient thickness to enable elastic deformation of the passage 16 upon insertion of the fibers 18a, 18b without disturbing the alignment function of adjacent passages 16. The thickness of the walls 26 and/or the CD of the periphery 24 of the passage 16 can vary, e.g., taper or widen, or be uniform. One or more vent holes 28, for venting air and/or as an access point to view the coupling of the fibers 18a, 18b, are provided at the approximate center point 30 of the passage 16 where fibers 18a and 18b meet in coaxial alignment.

The periphery 24 of each of the passages 16 of the elastomeric body 12 is formed with a precisely configured molding pin that extends to either side of the center point 30 of the passage 16 ensuring a consistency in periphery 24 from one side of the passage 16 to the other side of the passage, and ensuring a resulting coaxial optical alignment of fibers 18a, 18b with little to no transmission loss between fibers.

The frame 14, if utilized, may substantially cover the outer surfaces of the elastomeric coupling device 10. Alternatively, the frame 14, if utilized, may provide support only at various locations about the coupling device 10 to limit the restrictive effect of the frame 14 on the elastic deformation of the coupling device. In the example of FIG. 1A, the frame 14 provides minimal restriction by using centralized ribs 30 that allow the sides 32 and center 34 of the coupling device 10 to deform.

Figure 3:
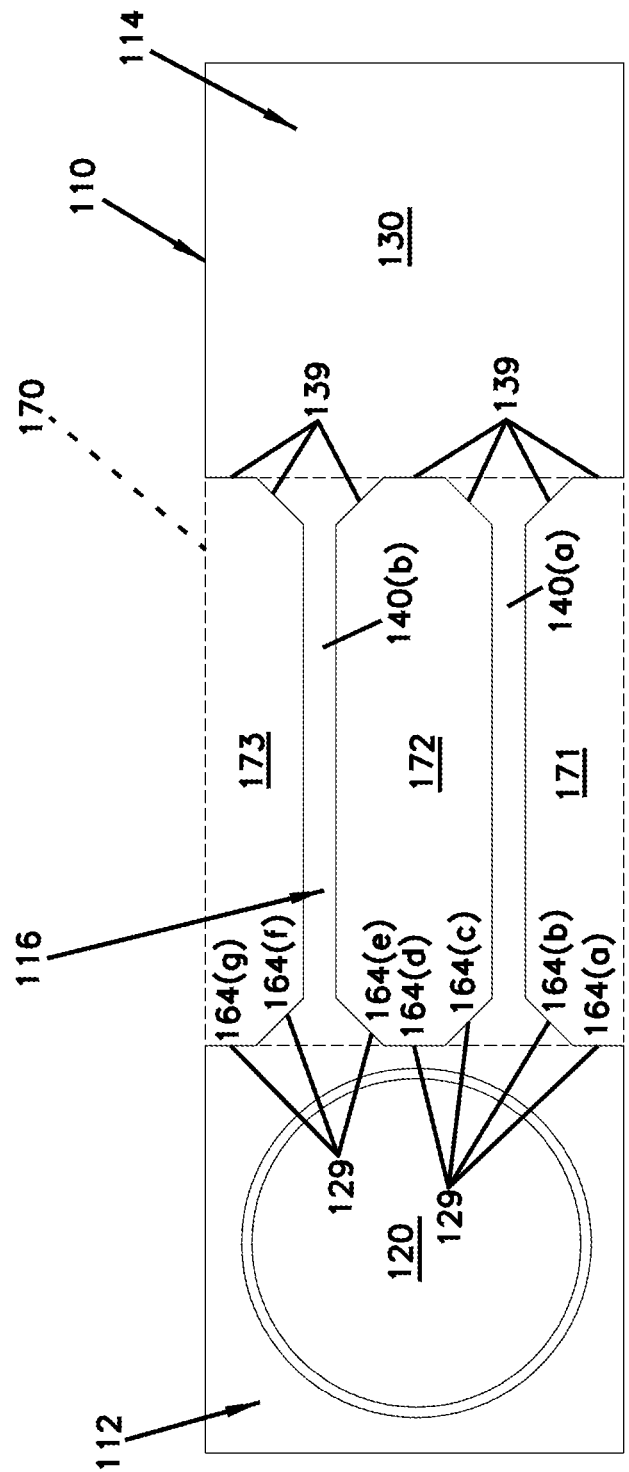
FIG. 3 is a top view of a frame of the coupling device.

Referring to FIGS. 2 and 3, a coupling device 100 of the present disclosure is illustrated. The coupling device 100 generally comprises an optional frame 110 and an elastomeric body 200.

The frame 110 includes a first side portion 112, a second side portion 114 and a central portion 116. The first side portion 112 includes an upper face 120 and an oppositely positioned lower face 122. In one example embodiment, the upper face 120 and the lower face 122 comprise two identical, symmetric parts that can be joined together with a pin and hole alignment mechanism. The upper face 120 and lower face 122 are connected by side walls 124 and 126, and by outer end wall 128 and inner end wall 129. Similarly, the second side portion 114 includes an upper face 130 and an oppositely positioned lower face 132. The upper face 130 and lower face 132 are connected by side walls 134 and 136, and by outer end wall 138 and inner end wall 139.

Figure 4:
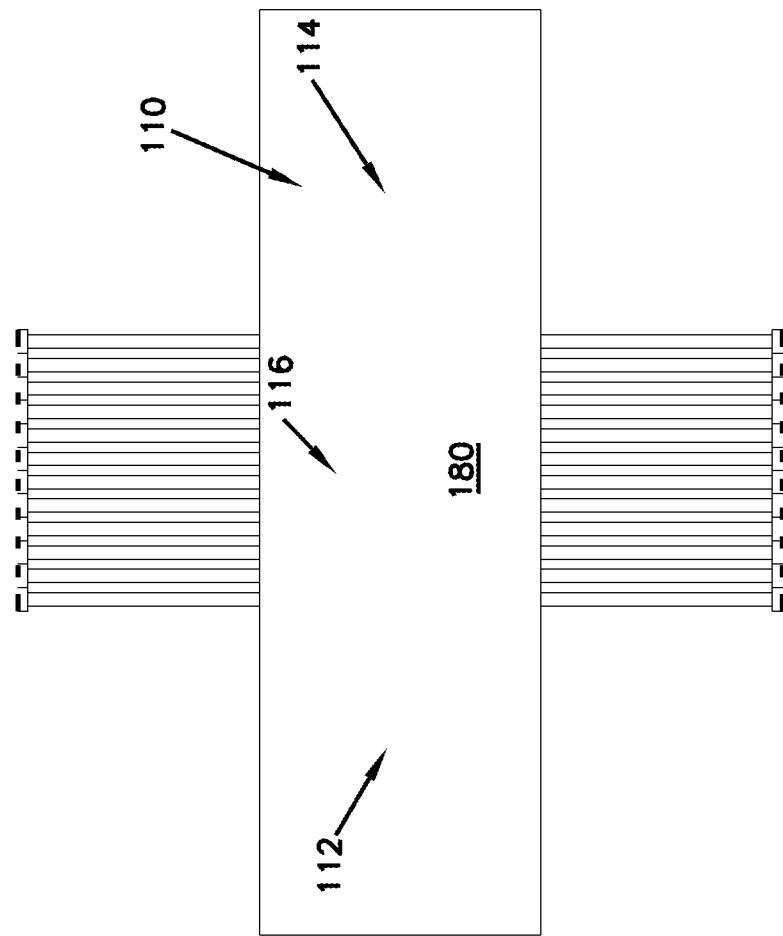
FIG. 4 is a top view of a frame of the coupling device.

The central portion 116, see FIG. 4, of the frame 110 connects the first side portion 112 to the second side portion 114. The central portion 116 includes two upper ribs 140(a), 140(b), and two lower ribs 142(a), 142(b), each of which extend between inner end walls 129, 139. The upper ribs 140(a), 140(b) each include an upper face 144 and a lower face 146 connected by proximal side wall 148 and distal side wall 150. Similarly, the lower ribs 142(a), 142(b) include an upper face 154 and a lower face 156 connected by proximal side wall 158 and distal side wall 160. A central cavity 170 extends through the central portion 116 that is bounded by inner end walls 129, 139 of the first and second side portions 112, 114, respectively. The central cavity 170 is further bounded by the lower faces 146 of the upper ribs 140(a), 140(b) and by the upper faces 154 of the lower ribs 142a, 142b. In this configuration, the ribs 140(a), 140(b), 142(a), 142(b) work in cooperation with the first and second side portions 112, 114 to define a first side chamber 171, a central chamber 172, and a second side chamber 173.

In some example embodiments, the inner walls 129, 139 present a single, elongate surface. In other example embodiments, the inner walls 129, 139 are configured to present a plurality of connected sections, e.g., sections 164(a)-164(g), see FIG. 3, that present a planar or arcuate surface. Further, in some example embodiments, the frame 110 is provided with a continuous upper face, e.g., face 180, and/or a continuous lower face, see FIG. 4. The frame 110 is configured to provide some stiffness, or structural rigidity, to the elastomer body 200 of the coupler 100.

Figure 5:
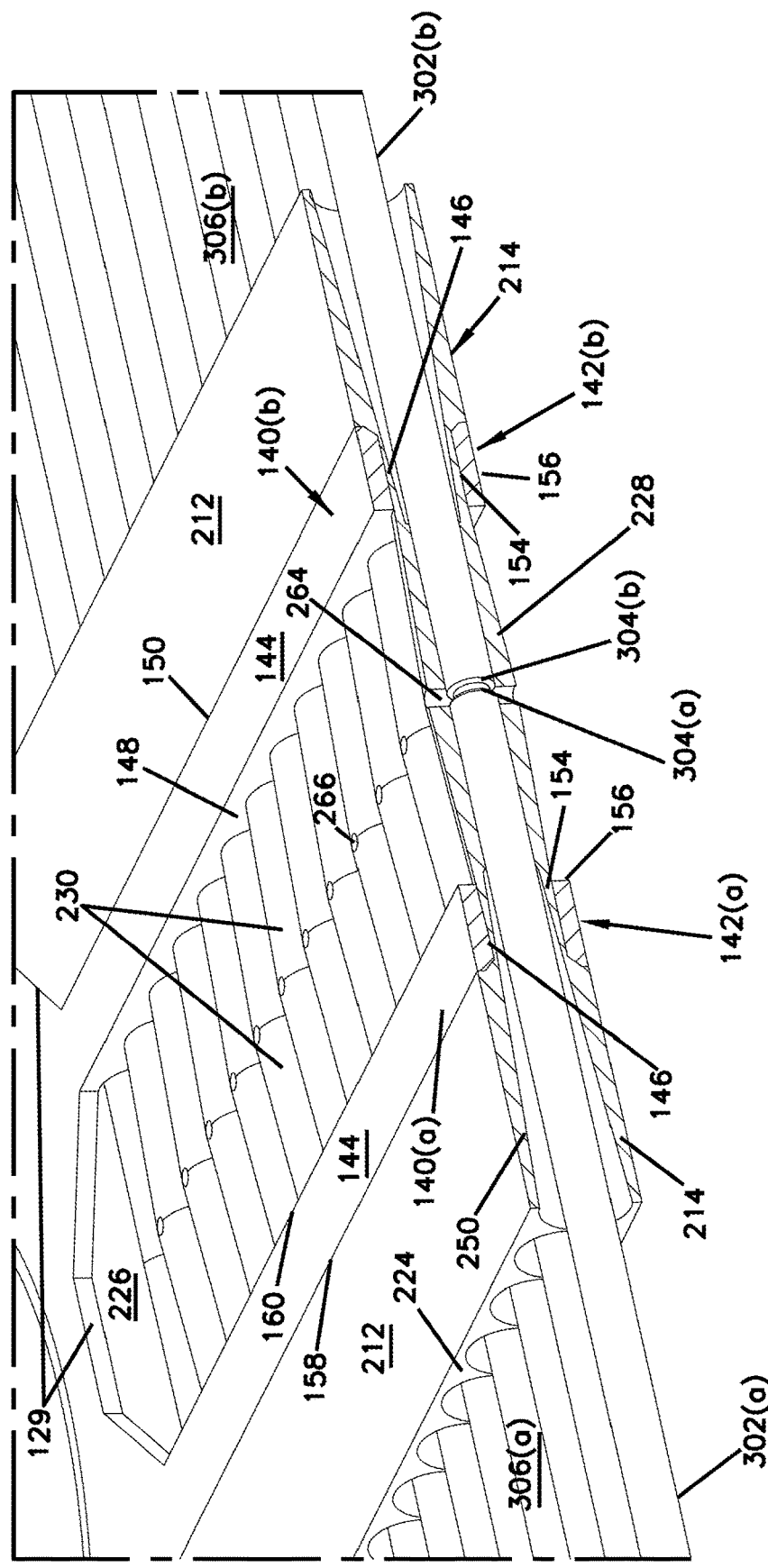
FIG. 5 is a cross-sectional view of an alignment passage of the coupling device of FIG. 1.
Figure 6:
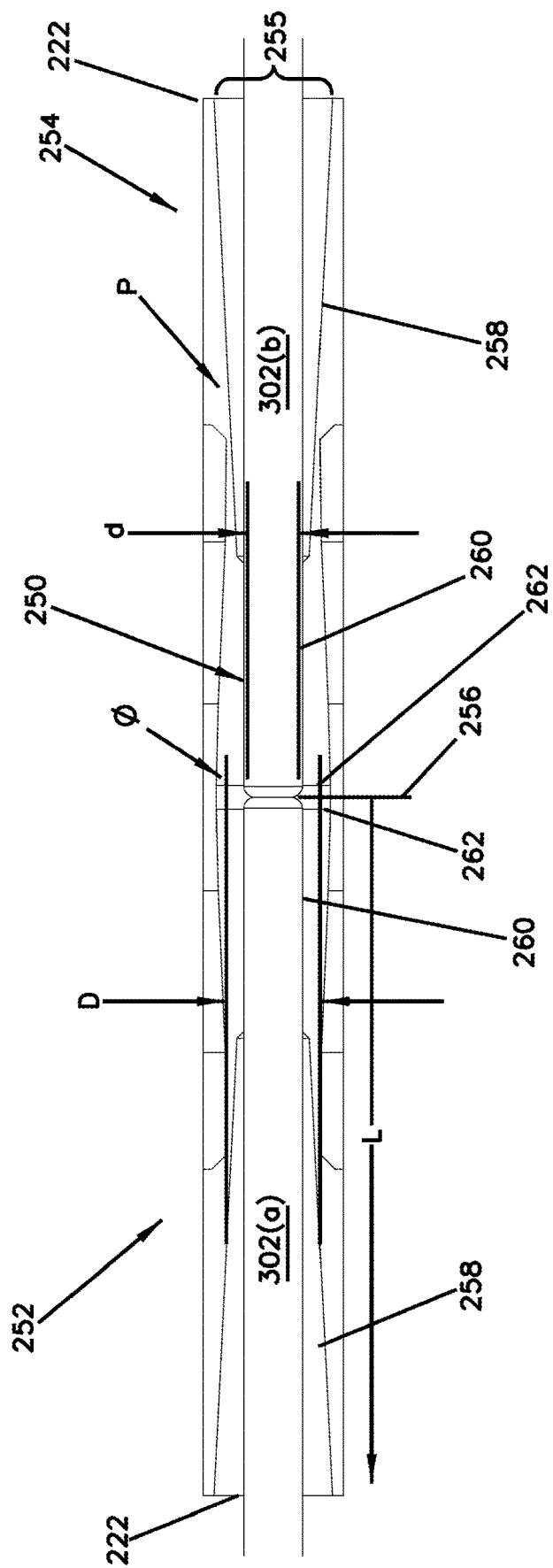
FIG. 6 is a cross-sectional view of an alignment passage of the coupling device of FIG. 1

Referring to FIGS. 2, 5 and 6, the elastomeric body 200 of the coupler 100 may be appreciated. The elastomeric body 200 comprises a single piece element that generally includes one or more alignment passages 250 extending there through. The alignment passages 250 are generally of a cylindrical configuration; however, in other example embodiments the alignment passages 250 are shaped in a different arcuate or walled configuration, e.g., triangular, square, hexagonal, etc. The elastomeric body 200 is configured to reside within the central cavity 170 and within the chambers 171, 172, 173 that are defined by the frame 110. Within the first and second chambers 171, 173 of the frame 110, the elastomeric body 200 presents a planar upper surface 212 and a planar lower surface 214 connected by a side wall 216 and end walls 218, 220. The side wall 216 presents the opening(s) 222 to the one or more alignment passages 250; spacers 224 separate the alignment passages 250. The end walls 218, 220 are provided with a shape, or are capable of conforming to, the configuration of the inner walls 129, 139 of the first and second side portions 112, 114, respectively, of the frame 110.

Within the central chamber 172 of the frame 110, the elastomeric body 200 presents an upper surface 226 and a lower surface 228 each incorporating one or more arcuate sections 230 in correspondence to the number of alignment passages 250. In other example embodiments, all upper and/or lower surfaces of the elastomeric body 200 incorporate arcuate sections. In still other example embodiments, all upper and/or lower surfaces of the elastomeric body 200 are substantially flat, or are various combinations of flat and arcuate sections. In still other example embodiments, the arcuate shape is replaced by a non-arcuate, e.g., walled, shaped. Note that the surfaces of the ribs 140a, 140b, 142a, 142b of the frame 110 that are proximate the elastomeric body 200 are configured to accommodate the arcuate and/or flat (or planar) nature of the upper and lower surfaces 226, 228 of the elastomeric body 200 as necessary.

Referring now to FIG. 6, each of the alignment passages 250 includes a first portion 252 and an opposing second portion 254, with the first and second portions 252, 254 meeting at a common location 256. In some example embodiments, the common location, or center point, 256 is at the middle of the alignment passage 250 while in other example embodiments the common location 256 is off-middle. In some example embodiments, each of the first and second portions 252, 254 includes a periphery 255 that begins at opening 222 extends through a tapering, conical section 258, to a non-tapered, cylindrical section 260, to endpoint 262. The non-tapered, cylindrical section 260 of the periphery 255 within the first and second sections 252, 254 of the passages 250 is configured to provide 360 degree support about the fiber to help establish the fiber core alignment.

In other example embodiments, the first and second portions 252, 254 include a periphery 255 having only a tapering conical section, tapering from opening 222 to endpoint 262. In still other various alternative embodiments, the first and second portions 252, 254 include a periphery 255 having only a non-tapered, cylindrical section that extends from opening 222 to endpoint 262. In still other example embodiments, the conical and cylindrical shapes are replaced by other arcuate configurations or walled configurations, e.g. triangular, square, and hexagonal, etc.

The common location, or center point, 256 is defined by an alignment passage 264, see FIG. 5, having a central axis that is perpendicular to the central axis of the alignment passages 250. The passage 264 extends through both the upper surface 226 and the lower surface 228 of the elastomeric body 200 providing a vent hole 266 at each end of the passage 264. In various alternative embodiments, the passage 264 remains within the boundaries of the upper and lower surfaces, 226, 228. In still other embodiments, the passage 264 is eliminated.

The non-tapered, cylindrical section 260 of the first and second portions 252, 254 of the alignment passages 250 within the elastomeric body 200 is configured to provide the core-to-core alignment between two optical fibers. The narrow tolerances required for core-to-core alignment are established through micro-molding, or other appropriate manufacturing techniques, of the alignment passages 250 of the elastomeric body 200. In one example embodiment, each of the passages 250 of the elastomeric body 200 is formed with a precisely configured molding pin to define the periphery 255 that will be in contact and encompass the fibers inserted therein. The molding pin is used such that it extends to either side of the center point 256 of the passage 250 ensuring a consistency in periphery 255 from one side of the passage 250 to the other. The result is a passage 250 that provide all-encompassing support to inserted fibers and precise coaxial alignment of fibers with little to no transmission loss between fibers.

As the name implies, the elastomeric body 200 comprises an elastomer, or elastomeric material, that is selected for its elastic deformation properties. In various example embodiments, the elastomer comprises a thermoset, high durometer silicon rubber. In other example embodiments, the elastomer comprises a highly-cross-linked polyolefin. In still other example embodiments, other elastomer materials are used.

A combination of various parameters can be used to optimize the core-to-core alignment provided by the elastomeric body 200. In various embodiments, and as illustrated in FIG. 6, the parameters for consideration in selecting the appropriate elastomeric material for the elastomeric body 200 can include one or more of the following: (1) free fiber length (L), e.g., the length of stripped optical fiber that is unsupported by the coupling device 100; (2) the outside diameter (D) of the periphery 255 of the passage 250; (3) the outside diameter variation angle ((p), e.g. how much the alignment passage 250 is allowed to flex to accommodate variation in outside diameters of optical fibers; (4) inside diameter (d) of the periphery 255 of the passage 250 (e.g., the portion of periphery 255 of the passage 250 that is in direct contact and encompasses the fiber 302(a), 302(b) inserted therein) and (5) elastomer material properties of modulus and/or durometer (P).

When considering all five of the parameters, the alignment quality of the coupling device 100 is defined as: Alignment Quality (Insertion Loss)≈f(P, D, d, φ, L). By way of example, when considering 125 micron, bare glass fibers, the parameter L typically falls in a range of 3 to 10 mm, the parameter D is typically ≥175 μm, and the parameter d is typically ≤125 μm. In other example embodiment, other and/or additional parameters are used to achieve a desired alignment quality between fibers when inserted into passages 250.

While the above described coupling device 100 can be configured for use with a pair of single fibers, it is especially suited to high density fiber applications as illustrated in the FIGS. 2 and 5. As shown, two high density sets 300(a), 300(b) of optical fibers 302(a) and 302(b) are presented for coupling; the edges of the fiber tips 304(a), 304(b) having been rounded by laser, fusion arc, or another treatment. A length of each optical fiber 302(a), 302(b) is stripped to its cladding 306(a), 306(b) and then inserted into corresponding openings 222, through the passages 250 to the common location 256. The elastomer material of the elastomeric body 200 operates to elastically flex in accommodating and aligning the outer diameters (OD) of the optical fibers 302(a), 302(b) such that the true centers of opposing fibers 302(a), 302(b) are aligned for minimal transmission loss of an optical signal. The ability to elastically deform, rather than plastically deform, enables the coupling device 100 to recover fully and provided identical performance over many cycles of use.

The coupling device 100 of the present disclosure provides for a single-material design that effectively combines the features of v-groove and presser spring alignment without actually requiring the v-groove or presser spring. More-over, the coupling device 100 presents a small form factor, an important feature for high density connectors. Further, the coupling device 100 provides 360 degree alignment contact, as opposed to the more standard configuration of two lines of contact, and additionally provides allowance for the slight buckling/bending of the stripped fiber length outside of the coupling device 100.

The coupling device 100 is configured to accommodate differences in fiber diameter, e.g., with the coupling device 100, the alignment passage 250 can "bulge out" during the fiber alignment process, yet still provide optical fiber centering; an improvement over the inflexible nature of v-groove arrays. Thus, the coupling device 100 eliminates the effects of fiber diameter mismatch leaving only fiber core/cladding concentricity errors, surface defect absorption/dispersion (which is small in fibers finished with laser or electric arcs), and mode field mismatch (usually a small factor) to affect fiber alignment.

It should be noted that while the description above describes the coupling device 100 for use with ferrule-less optical fibers, the coupling device 100 may also be configured for use with optical fibers that include ferrules.

Referring to FIG. 7, the coupling device 100 can additionally include a fiber optic guide 600 positioned about the frame 110 and elastomeric body 200. The fiber optic guide 600 includes a plurality of passages 602 configured to support and guide the length of stripped fiber that extends intermediate the coupling device 100 and the unstripped fiber. In some example embodiments, the guide 600 is of an elastomeric material selected for elastic properties in helping to align and support the various fibers 300(*a*), 300(*b*). In other example embodiments, the guide 600 comprises a non-elastic material.

What is claimed:

1. A fiber optic coupling device comprising:
   a unitary elastomeric body including a first end and a second end, with a plurality of open-ended passages extending from the first end to the second end,
   each of the passages receiving a first optical fiber inserted at the first end and a second optical fiber inserted at the second end, the first and second optical fibers inserted until abutting one another within the passage,
   the passages within the unitary elastomeric body elastically deforming to accept the first and second optical fibers, the elastic deformation of the passages enabling 360° support about at least a portion of each of the first and second optical fibers with the 360° support axially orienting each of the first and second fiber along a common axis.

2. The fiber optic coupling device of claim 1, wherein the first and second optical fibers are ferruled optical fibers.

3. The fiber optic coupling device of claim 1, wherein the first and second optical fibers are ferrule-less optical fibers.

4. The fiber optic coupling device of claim 1, wherein the first optical fiber has a first diameter and the second optical fiber has a second diameter that is different from the first diameter.

5. The fiber optic coupling device of claim 1, wherein each of the passages includes a vent hole through an upper surface of the passage.

6. The fiber optic coupling device of claim 5, wherein each of the passages includes a vent hole through a lower surface of the passage.

7. The fiber optic coupling device of claim 1, wherein each of the passages has an interior perimeter that gradually narrows from the open-end of each of the first and second ends to a location where the 360° support begins within the passage.

8. The fiber optic coupling device of claim 1, wherein each of the plurality of open-ended passages are distinct from one another.

9. A fiber optic coupling device comprising:
   a unitary elastomeric body including a first end and a second end, with a plurality of open-ended passages extending from the first end to the second end,
   each of the passages receiving a first optical fiber inserted at the first end and a second optical fiber inserted at the second end, the first and second optical fibers inserted until abutting one another within the passage,
   the passages within the unitary elastomeric body elastically deforming to accept the first and second optical fibers, the elastic deformation of the passages enabling 360° support about at least a portion of each of the first and second optical fibers with the 360° support axially orienting each of the first and second fiber along a common axis; and
   a frame supporting the unitary elastomeric body.

10. The fiber optic coupling device of claim 9, wherein the frame comprises an upper component secured to a lower component.

11. The fiber optic coupling device of claim 10, wherein the upper and lower components are identical and symmetric.

12. The fiber optic coupling device of claim 10, wherein the upper component includes an open portion through which at least a portion of the unitary elastomeric body is visible.

13. The fiber optic coupling device of claim 12, wherein one or more of the passage includes a vent hole and wherein the vent hole vents through the open portion of the frame.

14. The fiber optic coupling device of claim 12, wherein the open portion of the frame is bounded by a pair of ribs that extend across a width of the unitary elastomeric body.

15. The fiber optic coupling device of claim 9, further comprising a fiber optic guide positioned about the frame.

16. The fiber optic coupling device of claim 15, the fiber optic guide including a plurality of passages, each of the plurality of passages of the fiber optic guide aligned with a respective one of the open-ended passages of the unitary elastomeric body.

17. The fiber optic coupling device of claim 16, each of the passages supporting an unstripped portion of the first or second optical fiber.

18. The fiber optic coupling device of claim 9, wherein a selection of an elastomeric material from which to produce the unitary elastomeric body is based one or more factors that include: free fiber length, an outside diameter of the open-end of the passage of the unitary elastomeric body, an outside diameter variation angle, an inside diameter of the passage of the unitary elastomeric body and elastomer material properties of modulus and/or durometer.

19. The fiber optic coupling device of claim 9, wherein the unitary elastomeric body is manufactured using micro-molding.

20. The fiber optic coupling device of claim 19, wherein the micro-molding includes micro-molding the plurality of passages of the unitary elastomeric body about a molding pin.

* * * * *